United States Patent [19]

Wittler

[11] Patent Number: 5,097,643
[45] Date of Patent: Mar. 24, 1992

[54] INTERLOCKING STRUCTURAL MEMBERS WITH EDGE CONNECTORS

[76] Inventor: Waldemar E. Wittler, 25 Harbourside Rd., North Quincy, Mass. 02171

[21] Appl. No.: 630,067

[22] Filed: Dec. 19, 1990

[51] Int. Cl.⁵ .................... E04H 3/00; E04C 2/10; A47G 5/00
[52] U.S. Cl. .................... 52/238.1; 52/239; 52/581; 52/586; 52/281; 160/135; 160/351
[58] Field of Search .............. 52/238.1, 239, 581, 52/595, 586, 588, 280, 281, 282, 285, 578, 579; 404/41, 45; 160/135, 351

[56] References Cited

U.S. PATENT DOCUMENTS

| | | | |
|---|---|---|---|
| 2,228,363 | 1/1941 | Pinney | 189/34 |
| 2,414,060 | 1/1947 | Rausch | 20/4 |
| 2,948,364 | 8/1960 | Cooper | 189/34 |
| 3,009,549 | 11/1961 | Miller | 189/34 |
| 3,397,496 | 8/1968 | Sohns | 52/286 |
| 3,509,673 | 5/1970 | Witkosky et al. | 52/578 X |
| 3,695,330 | 10/1972 | Hasbrouck | 160/135 |
| 3,859,000 | 1/1975 | Webster | 52/588 X |
| 3,974,616 | 8/1976 | Beckley | 52/738 |
| 4,128,983 | 12/1978 | Matsubara | 52/731 |
| 4,186,539 | 2/1980 | Harmon et al. | 52/580 |
| 4,344,475 | 8/1982 | Frey | 160/135 |
| 4,438,605 | 3/1984 | DeLucia | 52/71 |
| 4,744,185 | 5/1988 | Lamberet et al. | 52/309 |
| 4,765,107 | 8/1988 | Ting | 52/235 |
| 4,828,005 | 3/1989 | Notley | 160/351 |
| 4,905,428 | 3/1990 | Sykes | 52/126 |

FOREIGN PATENT DOCUMENTS 1249410  1/1989  Canada .................... 52/239

Primary Examiner—David A. Scherbel
Assistant Examiner—Kien Nguyen

[57] ABSTRACT

An edge connector for connecting structural members at their adjacent edges is disclosed, including a base extending transversely between its edges, a support wall integral with the base and extending away from the base on one side thereof, the support wall extending generally parallel to the base edges and being positioned between the transverse center of the base and one edge; and a tongue integrally connected at one end to the support wall, extending from the support wall to a free end thereof; and spaced away from the base and positioned between the transverse center of the base and the other edge of the base on the side of the center opposite the one base edge, the tongue and the base defining a recess therebetween to receive the tongue of a mating connector.

25 Claims, 6 Drawing Sheets

INTERLOCKING STRUCTURAL MEMBERS WITH EDGE CONNECTORS

BACKGROUND OF THE INVENTION

This invention relates to interlocking structural members, (e.g., display panels) connected together at their edges.

Portable interlocking structural members such as display panels and room dividers, are frequently held together in the desired arrangement by connectors located along the edge of the panels. It is known to provide connectors consisting of bead and groove conformations in mating interfitting tongue and socket structures, oriented in the plane of the panels. The tongue and socket structures are interconnected by longitudinal movement of the adjacent panels towards each other.

SUMMARY OF THE INVENTION

In one aspect the invention features an edge connector for connecting structural members at their adjacent edges, including a base extending transversely between edges of the base; a support wall integral with the base extending away from the base on one side thereof, the support wall extending generally parallel to the base edges and positioned between the transverse center of the base and one edge of the base; and a tongue integrally connected at one end to the support wall and extending from the support wall to a free end thereof spaced away from the base and positioned between the transverse center of the base and the other edge of the base on the side of the center opposite the one base edge, the tongue and the base defining a recess therebetween to receive the tongue of a mating connector. Preferred embodiments include the following features. The edge connector comprises an elongated extrusion, and the base edges, support wall and tongue extend along the length of the extrusion. The base includes at least one leg integral with and extending away from the base on the other side opposite the support wall. Alternatively, the base includes two such legs and a crossbar spaced from the base and creating a channel between the legs, the base and the crossbar; the legs preferably extend away from the base beyond the crossbar. The end of the support wall and the side of the tongue opposite the recess define a continuous outer surface that includes a protrusion extending from the outer surface away from the recess between the transverse center of the base and the edge of the base near which the support wall is located. Preferably, the protrusion is located on the end of the support wall. The base includes a detent located between the transverse center of the base and the other edge, and preferably between the free end of the tongue and the other edge of the base. The tongue, in section, has parallel walls extending parallel to the base and is spaced from the base a sufficient distance to receive a similarly dimensioned tongue of a mating connector.

In another aspect the invention features a plurality of edge connectors integrally connected at the edges of their bases and angularly disposed relative to each other.

In another aspect the invention features a structural member and connector assembly including a structural member and a connector as described, the connector being attached to one side edge of the structural member, the structural member having at least one groove in its side edge receiving therein the leg integral with the connector and extending away from the connector base on the side opposite the support wall.

Edge connector strips for interlocking structural members that have a tongue oriented parallel to the base of the connector, so that the oppositely oriented tongue of an opposed connector is interlocked between the tongue and the base of the strip, form an easily assembled and disassembled and yet secure connection between adjacent units in a structural member assembly. The orientation of the connector strips on the edge of the structural members with the tongues of the connectors parallel to the structural member edges means that assembly and disassembly of the structural members requires very little maneuvering room.

DESCRIPTION OF THE PREFERRED EMBODIMENT

A lightweight, sturdy, adaptable display panel system that is easily assembled and disassembled is made of edge protected, plastic laminate clad styrofoam panels held together in the desired angular arrangement by extruded plastic connectors secured to the edges of the panels. The panel system is assembled by snapping together or engaging the appropriate connectors in a lateral movement past each other, in a plane perpendicular to the plane of an adjacent panel. To disassemble the panels, the connectors are unlocked by deflection out of the local plane of the assembled system.

Figure 1:
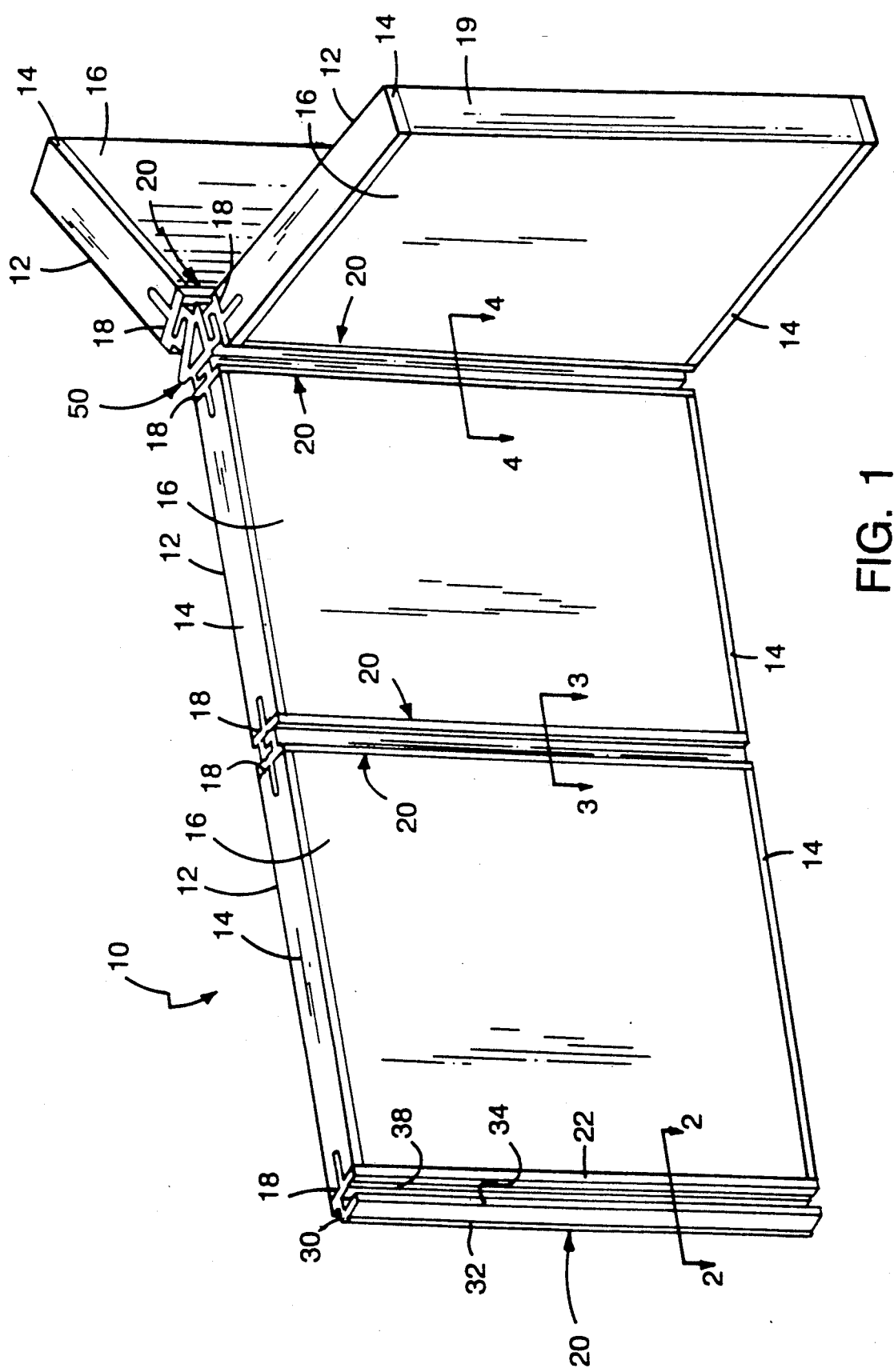
FIG. 1 is a perspective view of a panel system according to the invention.

Referring to FIG. 1, a system of structural members 10 comprises individual insulating foam panels (Branch River, Smithfield, R.I.) 12, typically 8.0' high×4' wide×1.5" thick, each having a two pound density expanded styrene styrofoam core, a 0.75" thick protective wood strip 14 top and bottom, and sides 16 laminated with a protective coating of 0.031" paper backed plastic laminate (not shown), the wood strip and the plastic laminate being attached to the foam core with a water-based resin (isoset resin WD3-A322 and hardner CX47, manufactured by Ashland Chemical Co.). At each vertical edge 18 of a panel 12, except for finish end edge 19, is a high impact extruded styrene plastic edge connector strip 20.

Figure 2:
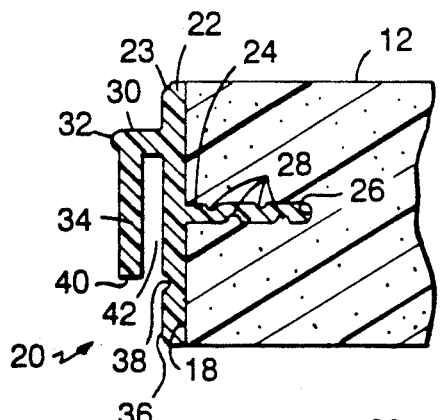
FIG. 2 is a sectional view taken at line 2—2 of FIG. 1.

Referring to FIG. 2, edge connector 20 consists of an elongated extrusion extending substantially the length of the panel edge 18. The connector has a 1.5" wide transverse base 22 extending the full width of a panel edge 18. The corners 23 of the base are chamfered at 45°. Base 22 has an integrally connected central leg 24 extending into a groove 26 in the center of the panel and generally forming a T with the base. Leg 24 contains a plurality of striations or notches 28 for holding an assembly glue compatible with the styrofoam core (e.g., a two part solventless epoxy resin, West System 105 Epoxy Resin, Group B, and Fast Epoxy Hardner 205 or Slow Epoxy Hardner 206, all manufactured by Gougeon Brothers, Inc., Bay City, Mich.). Beads of the glue are applied in the groove 26 and on the panel edges on each side of the groove 26 to securely bind the connector 20 to the panel 12. On the other side of the T an integrally connected short leg or support wall 30, (0.25" long), having a 0.031" high integrally connected protrusion or bead 32 on its end, is positioned between the transverse center of base 22 and one edge of the base and extends away from panel end 18 parallel to the edges of the base 22. Just below the bead 32, a 0.125" thick integrally connected tongue 34 extends 0.75" from support wall 30 parallel to base 22 to a free end spaced a short distance beyond the transverse center of the base the free end of tongue 34 positioned at a distance beyond the transverse center of the base 22 no greater than the distance from the center to the adjacent side of support wall 30, the tongue preferably being centered on the base. The spacing of the tongue from the base, thus forms recess 42 between the tongue and the base. The tongue 34 has parallel walls extending parallel to the base 22 and is spaced away from the base 22 a distance approximately equal to its thickness to receive the tongue of a mating connector in the recess between the tongue 34 and base 22. In the surface 36 of base 22 facing towards tongue 34, and just outside the projection of free end 40 of tongue 34 onto base surface 36, a 0.031" deep recessed detent or groove 38 extending parallel to wall 30 is provided to receive the bead on the support wall of another connector. The detent or groove 38 is spaced from the transverse center of the base 22, a distance equal to the spacing of bead 32 from the center. The base edges, wall 30, the free end of tongue 34, and detent or groove 38, extend along the length of the extrusion parallel to each other as shown in FIG. 1.

Figure 3A:
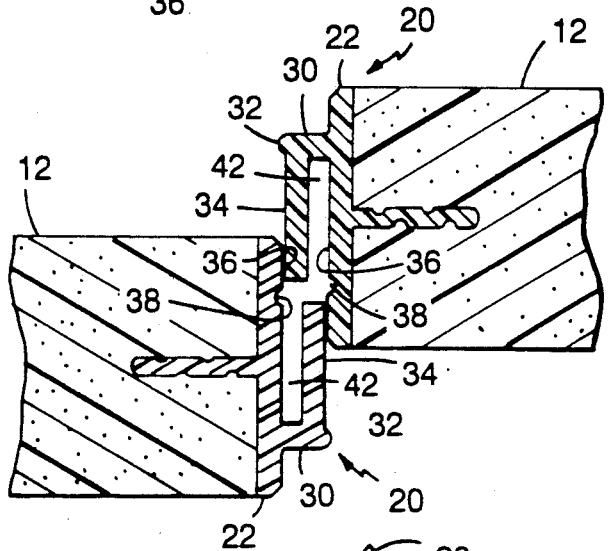
FIG. 3a is a sectional view taken at line 3—3 of FIG. 1 prior to the assembly of two adjacent panels.
Figure 3B:
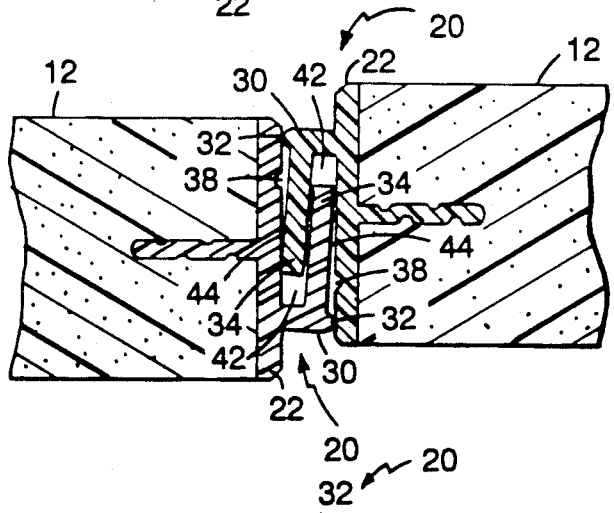
FIG. 3b is a sectional view taken at line 3—3 of FIG. 1 during the assembly of two adjacent panels.
Figure 3C:
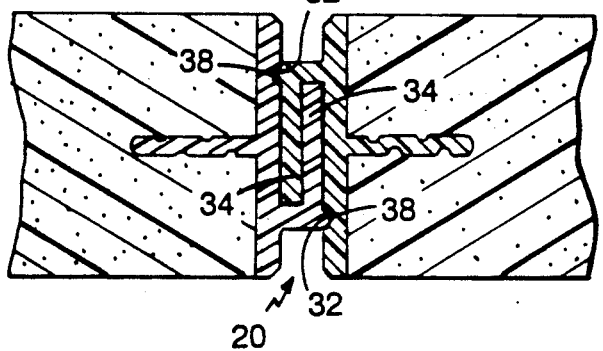
FIG. 3c is a sectional view taken at line 3—3 of FIG. 1 after assembly of two adjacent panels.

When a number of panels 12 are assembled into a system, linearly extending panels are held together by interlocking the identical opposing connector strips 20 on the edges of adjacent panels 12. Referring to FIG. 3a, to connect two panels, each connector tongue 34 is positioned opposite the entrance to recess 42 on the opposing connector. Referring to FIG. 3b, as each tongue 34 is moved laterally along the surface 36 of the opposing connector base, bead 32 is pushed onto surface 36 of base 22, thus forcing the outer surface 44 of each tongue 34 away from contact with surface 36 of the opposing base and deflecting each tongue 34 out of a plane parallel to the bases of the two connector strips 20. Finally, referring to FIG. 3c, as each tongue 34 is moved further into recess 42 of the opposing connector strip, each bead 32 reaches and snaps into groove 38 in the base of the opposing connector, locking the connectors and adjacent panels together.

Figure 4:
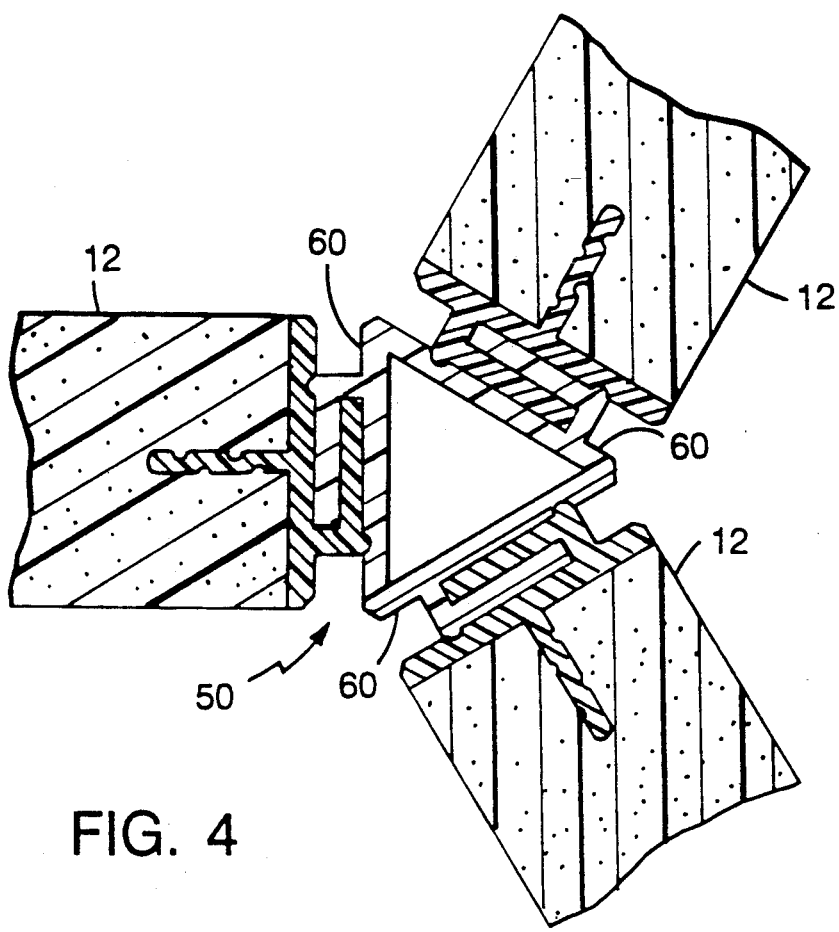
FIG. 4 is a sectional view taken at line 4—4 of FIG. 1.

Referring again to FIG. 1, numerous angular arrangements of various panels 12 are possible. For example, it may be desirable to connect three panels together in the form of a Y. For this application, a special connector post is used. Referring to FIG. 4, connector post 50 consists of three connectors 60, identical in dimension to connector 20 but lacking central leg 24. The individual connectors 60 are integrally connected at the edges of their bases to form an equilateral triangle. Connector post 50 is joined in sequence to three individual panels 12, using the same procedure as described before, to form the Y arrangement.

Figure 5:
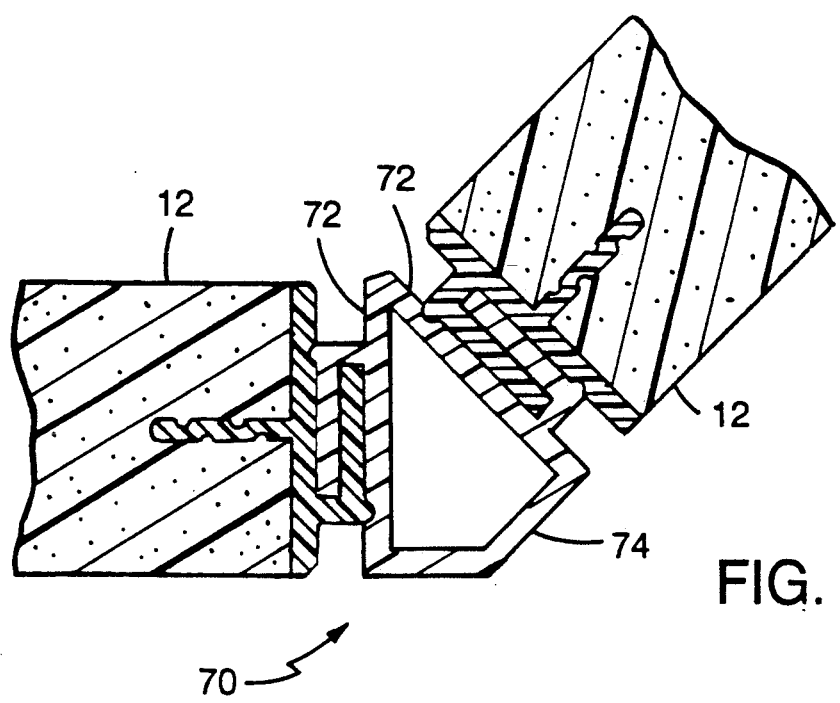
FIG. 5 is a sectional view of a panel system with panels arranged at 45° to one another.

In a similar manner, using appropriately designed connector posts, other panel arrangements can be formed. For example, referring to FIG. 5, a post 70, having two connectors 72 held apart at a 45° angle by a spacer 74, is used to join two panels 12 at an angle of 45°. Other angular connectors, e.g. 90° connectors, can likewise be employed.

Figure 6:
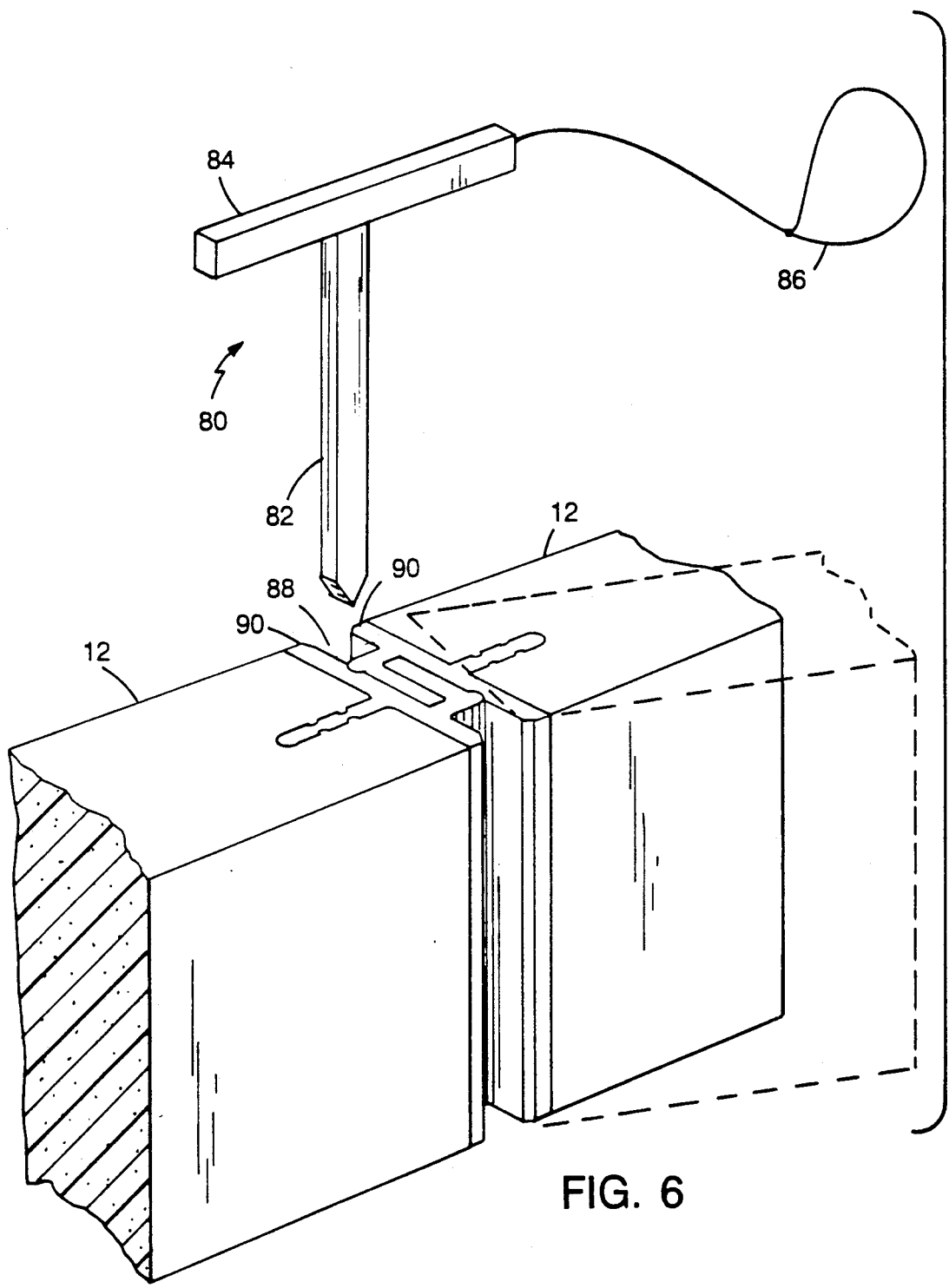
FIG. 6 is a perspective view of a panel system being disassembled and a tool used to aid disassembly.

As two individual connector strips interlock very securely, a specially designed releasing tool is used to disassemble panels so attached. Referring to FIG. 6, to release two attached connectors, tool 80, having a 0.281" wide shaft 82 tapered at its end, a handle 84, and a wrist strap 86, is inserted into the 0.25" wide space 88 between adjacent panels adjacent the interlocking connectors. As tool 80 is forced into space 88 parallel to the support wall of the adjacent connector, the ends 90 of the connectors are pushed apart to remove the adjacent bead from the channel of the connector. The panels 12 are then deflected out of the plane of alignment, as shown by the dotted line, and can be further disengaged manually.

Figure 7:
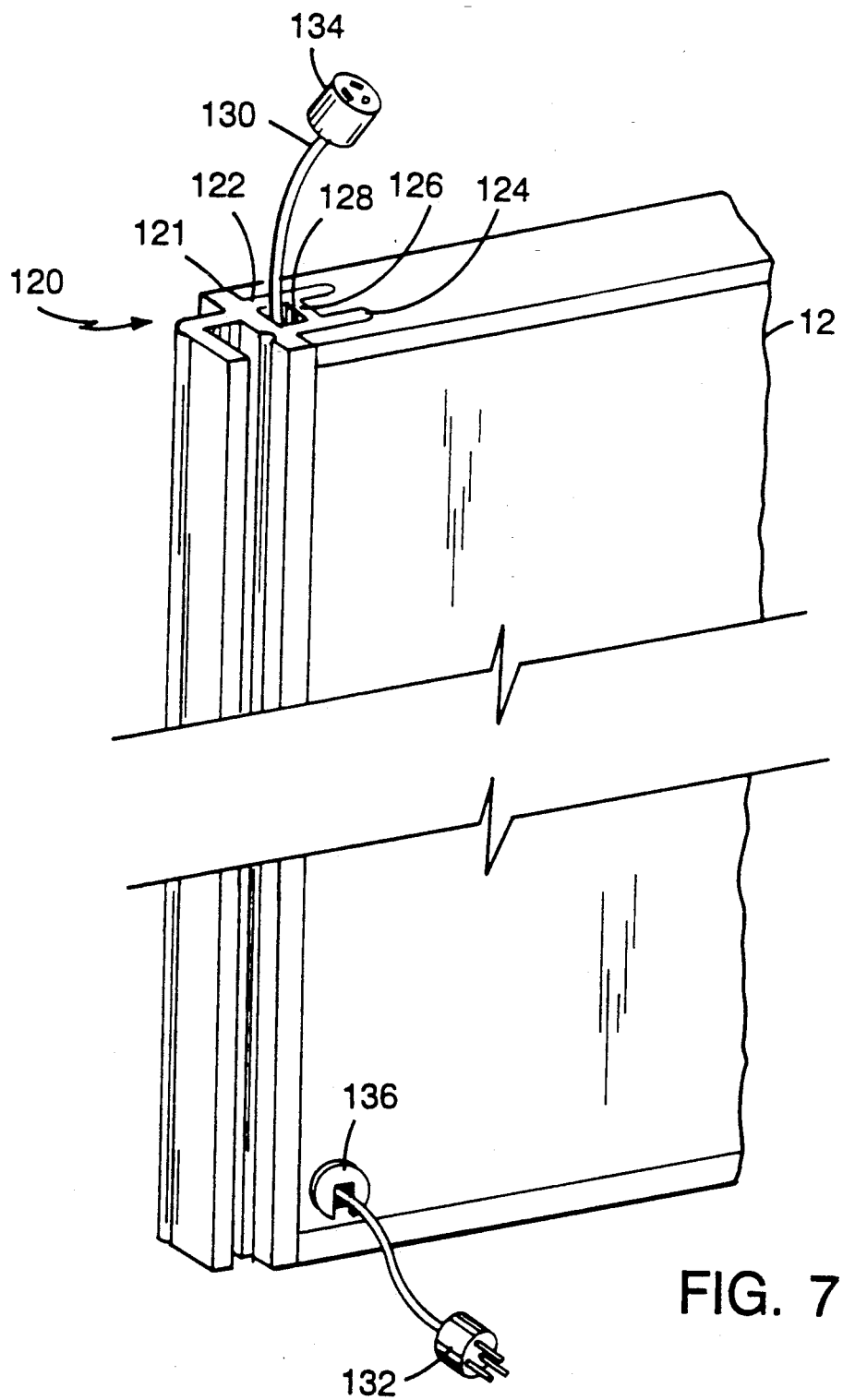
FIG. 7 is a partial perspective view of an alternate embodiment of a panel system according to the invention.

Referring to FIG. 7, a specially adapted connector strip 120, providing electricity on a panel for lights and other uses, has two legs 122,124 extending into a panel 12. A crossbar 126, between legs 122, 124 and spaced from base 121, forms a hollow channel 128 running the length of the connector strip. An electrical cord 130, having a plug end 132 and a socket end 134, is inserted into channel 128 through a hole in panel 12 and the wall of the channel and exits the panel near its base through a grommet 136.

Figure 8:
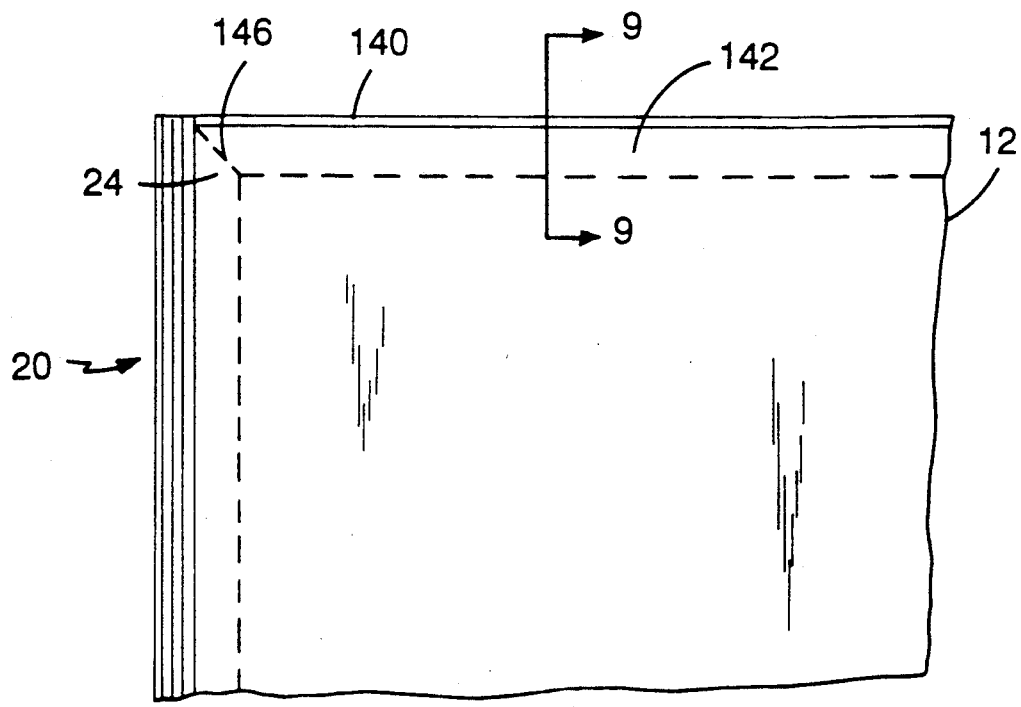
FIG. 8 is a partial side view of an alternate embodiment of a panel system according to the invention.
Figure 9:
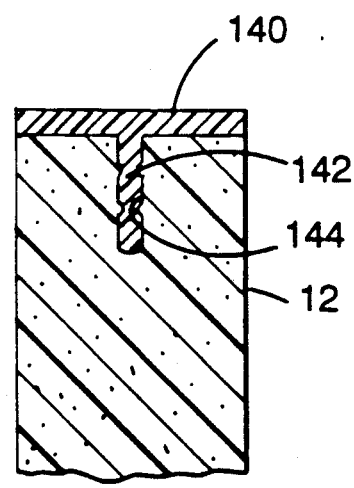
FIG. 9 is a sectional view taken at line 9—9 of FIG. 8.

Referring to FIGS. 8 and 9, in an alternative construction of a panel 12, a 0.031' thick styrene plastic cap 140, having a central leg 142 inserted in groove 144 in the top edge of the panel, provides top protection for the panel in place of a wooden strip. As indicated by the dotted lines in FIG. 8, recessed central leg 142 of the plastic cap 140 abuts the recessed leg 24 of edge connector 20 in a mitered joint 146. The cap 140 is secured to the panel by the same two part solventless epoxy resis as is utilized to secure the edge connector 20 to the panel 12. A similar cap may be used along the base of the panel.

Use

The panels can be assembled in any desired arrangement, e.g., as room dividers or as a backdrop for a display at a trade show. They are lightweight, one 8' panel weighing only about 27 pounds, and yet the system is sturdy, with the connector strips holding the panels securely together.

Other embodiments are within the following claims. For example, the panels can be of a variety of sizes (e.g., of widths varying from 0.75"-3"), can be made of any other kind of convenient material, such as wood or corrogated cardboard, and can be finished with any kind of surface material, e.g., cloth. The connector strips can also be made of resilient metal and can be interlocked by friction fit rather than by a bead and groove arrangement as described. Extrusion lengths can be varied as desired for panels of different heights. With stronger panel material and the appropriately oriented connector, the panel system can be used to form support systems or containers.

What is claimed is:

1. An edge connector for connecting structural members at their adjacent edges, comprising:
   a base extending transversely between edges of said base;
   a support wall integral with said base extending away from said base on one side thereof, said support wall extending generally parallel to said base edges and being positioned between the transverse center of said base and one edge of said base;
   a detent or groove in said one side of said base positioned between said transverse center of said base and said other edge of said base; and
   a tongue integrally connected at one end to said support wall and extending from said support wall to a free end thereof spaced away from said base and positioned between the transverse center of said base and the other edge of said base, said tongue and said base defining a recess therebetween to receive a tongue of a mating connector.

2. The edge connector of claim 1 wherein the end of said support wall spaced from said base and the side of said tongue opposite said recess define an outer surface comprising a protrusion extending from said outer surface away from said recess between said transverse center of said base and said one edge of said base.

3. The edge connector of claim 2 wherein said protrusion is located at the end of said support wall.

4. The edge connector of claims 1, 2 or 3 wherein said detent or groove is located between said free end of said tongue and said other edge of said base.

5. The edge connector of claim 1 wherein said tongue, in section, has parallel walls extending parallel to said base, said tongue spaced from said base a distance sufficient to receive a similarly dimensioned tongue of said mating connector.

6. The edge connector of claim 1 wherein said base further comprises at least one leg integral with and extending away from said base on the other side thereof opposite said support wall.

7. The edge connector of claim 6 wherein said base further comprises at least two said legs integral with and extending away from said base on the other side thereof opposite said support wall.

8. The edge connector of claim 7 wherein said base further comprises a crossbar between two said legs, said crossbar being spaced from said base and creating a channel between said legs, said base and said crossbar.

9. The edge connector of claim 8 wherein said two legs extend away from said base beyond said crossbar.

10. The edge connector of claim 1 wherein said connector comprises an elongated extrusion, said base edges, support wall and tongue extending along the length of said extrusion.

11. The edge connector of claim 10 wherein said support wall further comprises an bead extending therealong away from said wall and beyond said tongue, said tongue extends from said support wall generally parallel to said base a distance beyond said center to said free end no greater than the distance from said center to the adjacent side of said support wall, said tongue spaced from said base a distance approximately equal to the thickness of said tongue between the walls thereof, and said base comprises an elongated groove parallel to said support wall positioned adjacent and beyond said free end of said tongue and spaced from said center a distance equal to the spacing of said bead from said center, said groove adapted to receive a bead on the support wall of a mating connector with the tongue of said mating connector positioned between the tongue and base of said edge connector.

12. The edge connector of claim 11 wherein said base further comprises at least one leg integral with and extending away from said base on the other side thereof opposite said support wall.

13. The edge connector of claim 12 wherein said base further comprises at least two said legs integral with and extending away from said base on the other side thereof opposite said support wall.

14. The edge connector of claim 13 wherein said base further comprises a crossbar between two said legs, said crossbar being spaced from said base and creating a channel between said legs, said base and said crossbar.

15. The edge connector of claim 14 wherein said two legs extend away from said base beyond said crossbar.

16. A structural member comprising a panel and at least one connector as claimed in either of claims 6 or 12, said connector attached to one side edge of said panel, said panel having at least one groove in its said side edge receiving therein said at least one leg of said connector.

17. The structural member of claim 16 wherein said leg is adhesively secured in said groove.

18. The structural member of claim 16 wherein said panel comprises styrofoam.

19. The structural member of claim 18 wherein said leg is adhesively secured to said styrofoam in said groove.

20. The structural member of claim 16 wherein said base further comprises at least two said legs integral with and extending away from said base on the other side thereof opposite said support wall.

21. The structural member of claim 16 wherein said base further comprises a crossbar between two said legs, said crossbar being spaced from said base and creating a channel between said legs, said base and said crossbar.

22. The structural member of claim 16 wherein said two legs extend away from said base beyond said crossbar.

23. The edge connector of any one of claims 1, 2, 3, 5, 10, or 11 wherein said connector comprises one of a plurality of connectors integrally connected at the edges of the bases thereof, said connectors angularly disposed relative to each other.

24. The edge connector of claim 23 wherein said detent or groove is located between said free end of said tongue and said other edge of said base.

25. A structural member comprising a panel and at least one connector as claimed in claim 1, said connector attached to one side edge of said panel.

* * * * *